No. 722,693. PATENTED MAR. 17, 1903.
E. R. GOINGS.
FRUIT, VEGETABLE, OR CEREAL EVAPORATOR.
APPLICATION FILED OCT. 29, 1902.
NO MODEL. 2 SHEETS—SHEET 1.

Witnesses
Inventor
Elisha R. Goings
by Hegdon & Longan Attys.

No. 722,693. PATENTED MAR. 17, 1903.
E. R. GOINGS.
FRUIT, VEGETABLE, OR CEREAL EVAPORATOR.
APPLICATION FILED OCT. 29, 1902.
NO MODEL. 2 SHEETS—SHEET 2.
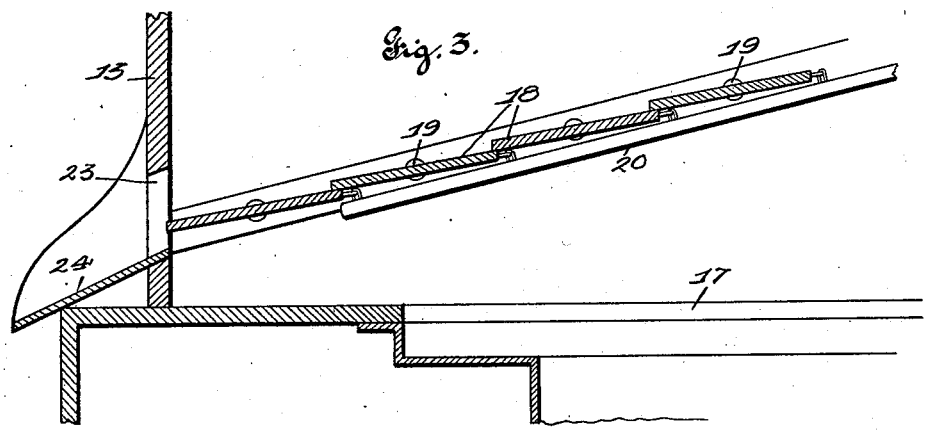
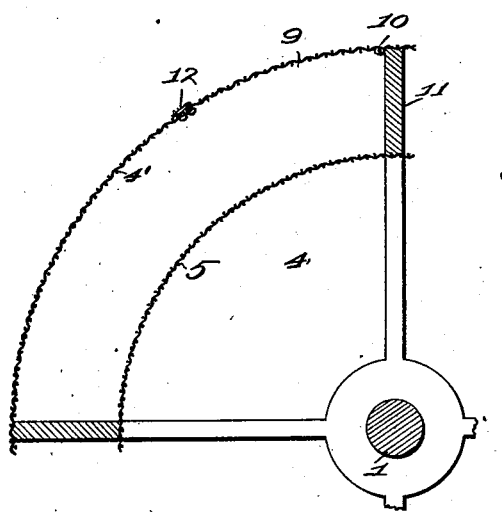
Witnesses
Alfred W Eicker
M. G. Irion
Inventor
Elisha R. Goings
by Higdon & Longan attys.

UNITED STATES PATENT OFFICE.

ELISHA R. GOINGS, OF CLAY CITY, ILLINOIS.

FRUIT, VEGETABLE, OR CEREAL EVAPORATOR.

SPECIFICATION forming part of Letters Patent No. 722,693, dated March 17, 1903.

Application filed October 29, 1902. Serial No. 129,262. (No model.)

*To all whom it may concern:*

Be it known that I, ELISHA R. GOINGS, residing in Clay City, Clay county, Illinois, have invented certain new and useful Improvements in Fruit, Vegetable, or Cereal Evaporators, of which the following is a full, clear, and exact description, reference being had to the accompanying drawings, forming a part hereof.

My invention relates to improvements in evaporators, and has for its object to provide a revoluble evaporating-chamber contained within the heated chamber and means whereby the parts of the evaporator are accessible and whereby the heat may be regulated, together with means for the injection and ejection of the substances which are to be or have been evaporated.

My invention consists in the peculiar construction and arrangement of parts hereinafter described and claimed and will be more readily understood by reference to the accompanying drawings, which form part of this specification, and in which—

Figure 1:
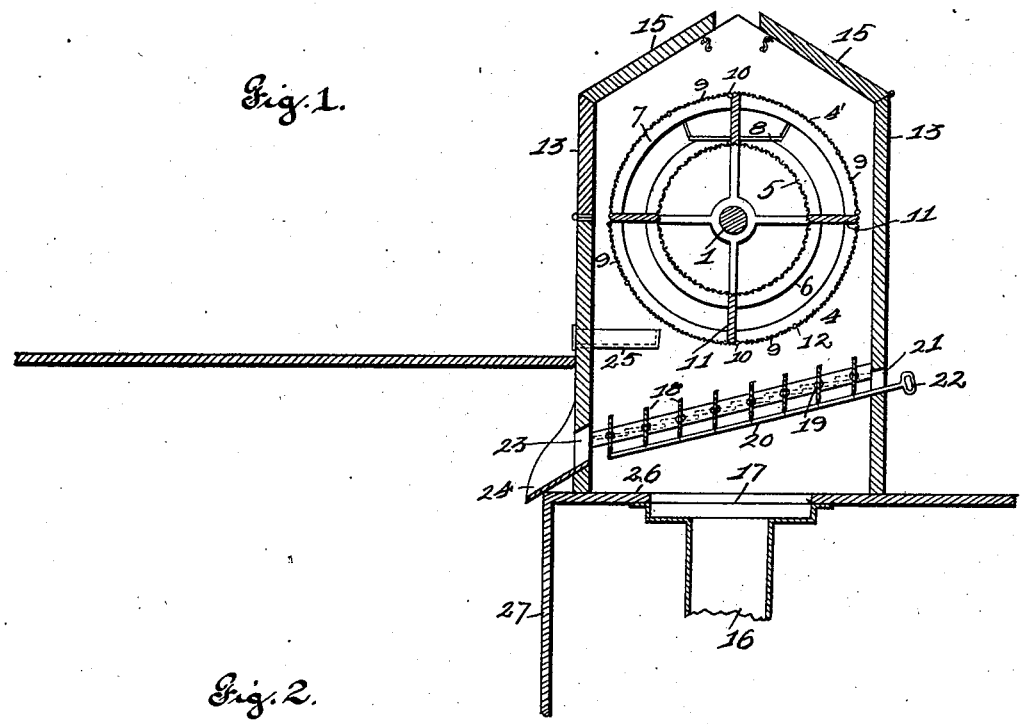
Figure 2:
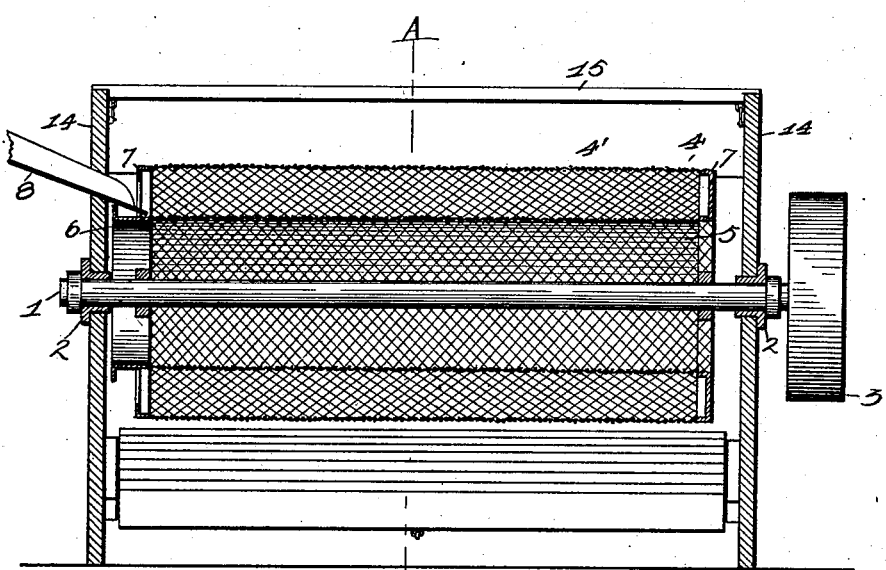

Figure 1 is a vertical cross-section of my evaporator, taken on line A A of Fig. 2. Fig. 2 is a vertical longitudinal section of the same. Figs. 3 and 4 are details of construction.

On the longitudinal axle 1, mounted in boxes 2 and provided with the belt-wheel 3, is fastened the cylindrical sectional receptacle 4, which is provided with the inner wall 5, the inner and outer walls being composed of wire netting or gauze, the inner wall 5 being mounted upon the inner edges of the rings 6 and the outer wall 4' being mounted upon the outer edges of the rings 7.

The substance to be evaporated is fed into the end of the sections of the evaporating-cylinder by means of the chute 8. The outer wall 4' of each section is provided with a hinged door 9, which is hinged at the point indicated as 10 to the intervening partition 11, which is fixed between the rings 6 and 7. The doors 9 are provided with fasteners 12, by which they are held to the adjoining edge of the outer wall 4'. It will be seen that there are four partitions 11 extending from end to end of the cylinder and acting to support the outer wall 4'. The partitions 11 are not shown in Fig. 2, for the reason that the cylinder is turned in such position that it would be impossible for said partitions to be shown; but they are clearly shown in Figs. 1 and 4.

The outer housing of the evaporator consists of the side walls 13, the end walls 14, and the removable top sections 15.

Heat is admitted to the evaporator by means of the flue 16, which opens into the bottom of the evaporator. Above the flue-opening 17 are arranged a number of longitudinal strips 18, which are hinged to the end walls 14 by means of the pivots 19 and which are connected upon their lower edges by the bar 20, which extends through the opening 21 in the wall 13 and terminates in the handle 22, by means of which the strips 18 are permitted to stand vertically for the purpose of admitting heat from the flue 16, as shown in Fig. 1, or drawn together and closed, as shown in Fig. 3, in which latter case they form an inclined bottom for the evaporator, which will receive and discharge the products of the evaporator by ejecting them through the opening 23 in the wall 13 and through the chute 24. A pan 25 is fitted in and through one wall of the outer chamber and serves as a receptacle for sulfur or other bleaching material which it is desired to employ during the process of evaporation.

The structure thus far described is mounted upon a supporting-floor 26, which is mounted upon the wall 27 of the receiving-chamber into which the chute 24 extends.

Having thus described my invention, what I claim as new, and desire to have secured to me by the grant of Letters Patent, is—

1. An evaporator consisting of a revoluble cylinder having inner and outer walls and mounted upon a longitudinal axle provided with a wheel, a flue for the admission of heat, a longitudinal partition serving to admit heat when opened, and to act as a chute for the product of the evaporator when closed, together with a chute whereby the material to be evaporated is introduced within the evaporating-cylinder, and a chute whereby the product of the evaporator is withdrawn, substantially as specified.

2. An evaporator consisting of a revoluble cylinder having inner and outer walls and mounted upon a longitudinal axle provided with a wheel, a flue for the admission of heat, a longitudinal partition serving to admit heat when opened, and to act as a chute for the product of the evaporator when closed, together with a chute whereby the material to be evaporated is introduced within the evaporating-cylinder, a chute whereby the product of the evaporator is withdrawn, a receptacle mounted upon and through one of the outer walls and adapted to hold bleaching material, substantially as specified.

3. The improved evaporator, comprising a revoluble double cylinder composed of an outer and an inner wall of reticulated material spaced apart, suitable bearings for said cylinder, means for revolving same, an opening for entrance between said walls of the material to be evaporated, a movable door to permit the discharge of the evaporated material, an inclined partition formed of slats beneath said cylinder for receiving the discharged material, and means for moving said slats to form an entrance for heat, substantially as specified.

In testimony whereof I affix my signature in presence of two witnesses.

ELISHA R. GOINGS.

Witnesses:
ALFRED A. EICKS,
M. G. IRION.